Figure 3:
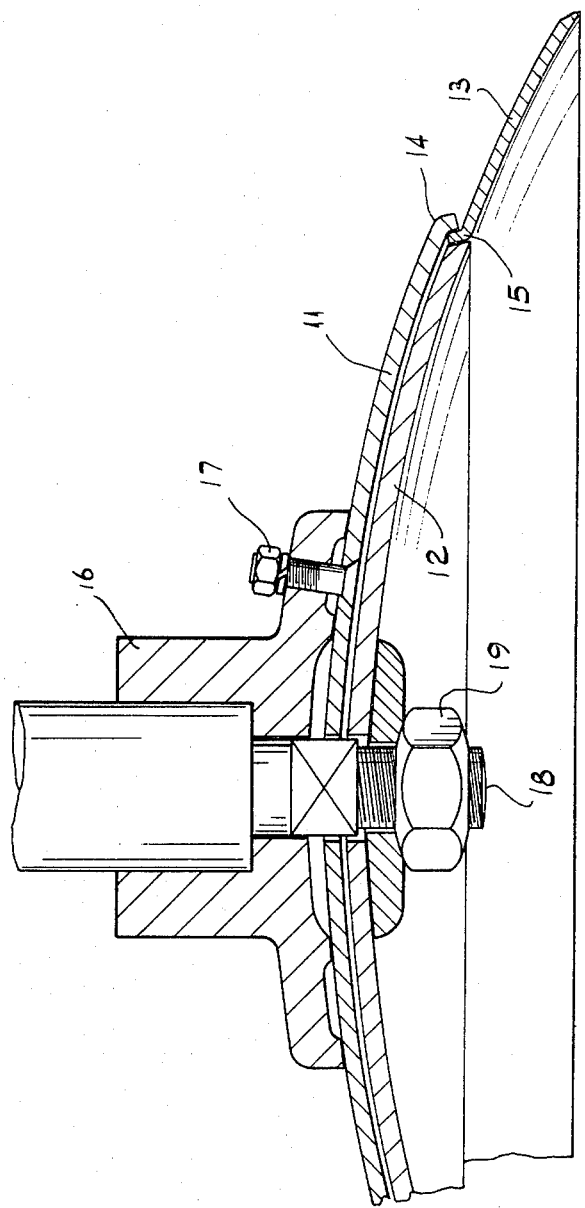

United States Patent [19]

Johnson

[11] 4,246,971
[45] Jan. 27, 1981

[54] TILLAGE DISCS

[75] Inventor: William M. Johnson, Melton South, Australia

[73] Assignee: Ralph McKay Limited, Victoria, Australia

[21] Appl. No.: 959,444

[22] Filed: Nov. 13, 1978

[30] Foreign Application Priority Data

Nov. 22, 1977 [AU] Australia ............................. 2501/77

[51] Int. Cl.³ ............................................. A01B 23/06
[52] U.S. Cl. ..................................... 172/535; 172/604
[58] Field of Search ....................... 272/604, 556, 535; 172/539, 555, 535, 604

[56] References Cited

U.S. PATENT DOCUMENTS

| 126,655 | 5/1872 | Tuttle | 172/604 |
|---|---|---|---|
| 442,671 | 12/1890 | Tower | 172/604 |
| 1,663,239 | 3/1928 | Bucknam | 172/604 |
| 2,271,354 | 1/1942 | Strandland | 172/604 |
| 2,701,996 | 2/1955 | Wiese | 172/535 |
| 3,451,488 | 6/1969 | Taketa | 172/356 |
| 3,690,385 | 9/1972 | Weiss | 172/604 |
| 3,877,159 | 4/1975 | Boomstra | 172/604 X |

Primary Examiner—Richard J. Johnson
Attorney, Agent, or Firm—Buell, Blenko, Ziesenheim & Beck

[57] ABSTRACT

An agricultural tillage disc having a replaceable annular blade. The central hub of the disc consists of two sections clamped together so that the inner edge of the annular blade is securely held therebetween.

3 Claims, 3 Drawing Figures

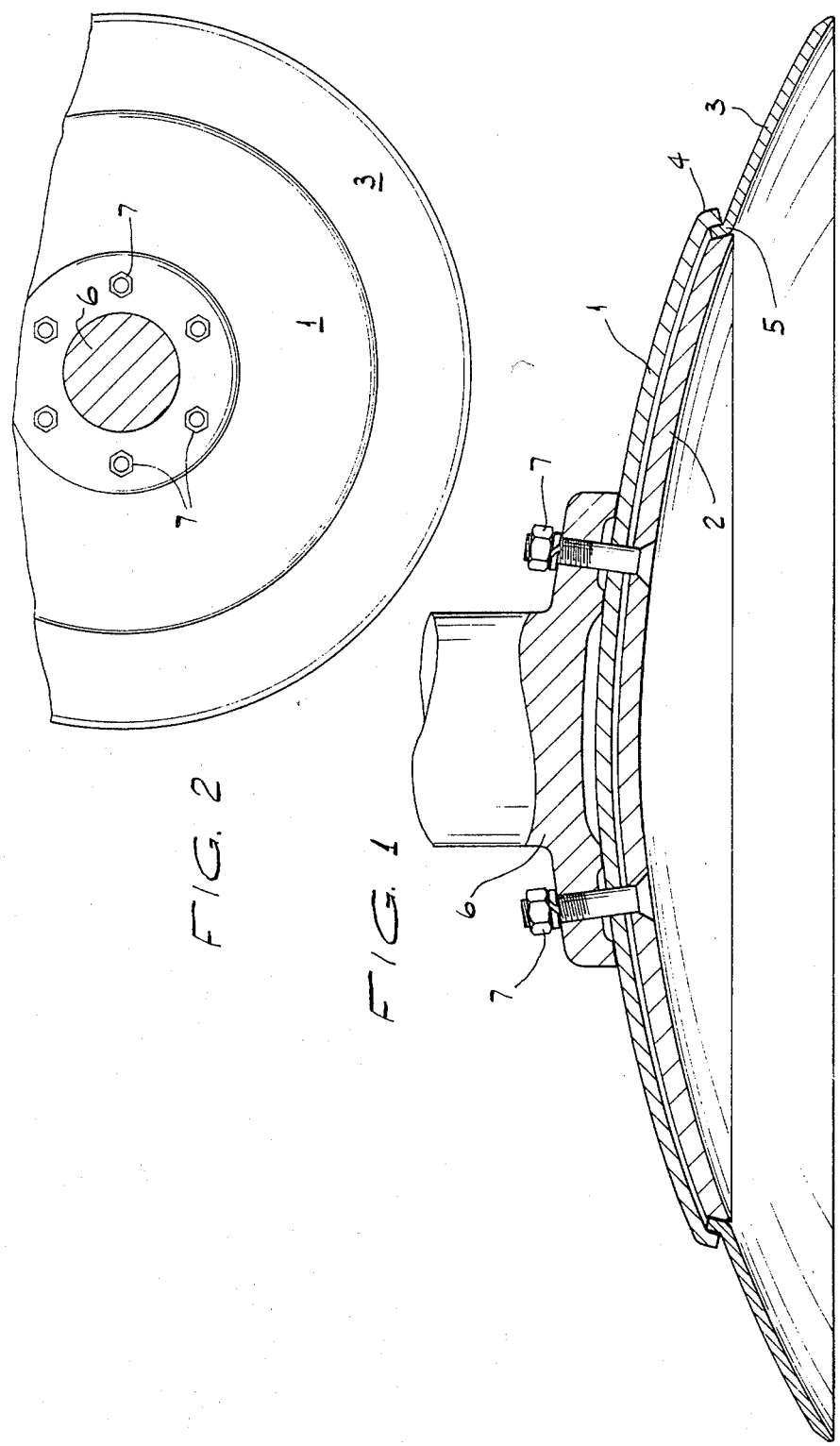

TILLAGE DISCS

This invention relates to agricultural implements and in particular to agricultural discs.

Agricultural discs have always proved expensive and the prime reason is that once the outer peripheral cutting edge has worn away the disc diameter becomes too small and the disc must be replaced even though a large portion of the original disc remains. It has been proposed that the outer edge of the disc be made as a replaceable annulus which can be bolted to a central hub. This would provide a cheap replaceable cutting edge for agricultural discs. However, prior proposals have only suggested that the annual cutting edge be bolted to the inner hub.

It is an object of this invention to provide a simple means of securing a replaceable annular blade onto a disc hub.

To this end the present invention provides an agricultural disc comprising a central disc hub and an outer annular blade, said central disc hub consisting of two members secured together and said annular blade having an inner edge adapted to fit between said two members of said disc hub.

The two parts of the disc hub are preferably continuous peripheral edge sections about the circumference of the disc hub. Two disc hubs bolted together are a simple means of achieving the present invention. The inner diameter of the annular blade is selected to ensure overlap with the outer circumferential edges of the two disc hubs. In this way when the disc hubs with the annular blade between them is assembled all three have a common axis.

FIG. 1 of the accompanying drawings illustrates a preferred form of the invention in a sectional view.

FIG. 2 is a partial plan view of the embodiment of FIG. 1. The outer disc hub 1 includes a flanged end 4 which overlaps the outer edge of the inner disc hub 2. The annular blade 3 has a flanged inner edge 5 which is secured between the outer edge of the inner disc hub 2 and the flanged end 4 of the outer disc hub 1. The disc hubs can be permanently secured to the disc support 6 of the tillage machine by bolts 7. The bolts 7 can be removed to enable replacement of the annular blade 3 and replaced to secure the blade in position.

An alternative embodiment of the invention is illustrated in FIG. 3.

Once again the disc assembly comprises an outer disc hub 11 which has a flanged periphery 14 which overlaps the outer edge of the inner disc hub 12. The annular blade 13 has a flanged inner edge 15 which is secured between the outer edge of the inner disc hub 12 and the flanged end 14 of the outer disc hub 11. The disc hubs are permanently secured to the disc support 16 by the central axial bolt 18. Removal of the nut 19 of bolt 18 enables the inner disc hub 12 to be removed to allow for replacement of the annular blade 13. The single bolt 17 simply secures the inner hub 11 to the disc support 16. The bolt 17 need only be fastened during the operation of replacing the annular blade 13.

These two forms of the invention is a simple secure means of fixing a replaceable annular blade to a central disc hub to provide an agricultural disc equivalent in performance to the traditional one piece discs. In both embodiments the support 6 or 16 and the outer hub 1 or 11 can be formed as a single integral part. Although initial outlay is higher long term costs are lowered due to the inherently lower material costs of the replaceable annular blades.

From the above description it can be seen that the present invention provides simple means of securing a replaceable annular disc blade to a central disc hub.

I claim:

1. An agricultural disc comprising a central disc hub assembly and an outer annular blade wherein said disc hub assembly comprises a first member and a second member secured to each other, said first member having a generally axially extending flanged perihery which overlies the periphery of said second member and said annular blade having on its inner periphery a complementary generally axially extending flange to the flanged periphery of said first member secured between the peripheries of said first and second members and the radius of said disc hub assembly periphery being greater than the radial width of said blade.

2. A disc as claimed in claim 1 wherein said two members are secured together by a series of bolts located around the periphery of said members.

3. A disc as claimed in claim 1 wherein said two members are secured together by single bolt coaxial with said annular blade.

* * * * *